United States Patent [19]

Chapman

[11] Patent Number: 5,816,552

[45] Date of Patent: Oct. 6, 1998

[54] CAMERA DOLLY ARM ATTACHMENT

[75] Inventor: Leonard T. Chapman, North Hollywood, Calif.

[73] Assignee: Chapman/Leonard Studio Equipment Co., North Hollywood, Calif.

[21] Appl. No.: 411,501

[22] Filed: Mar. 27, 1995

Related U.S. Application Data

[63] Continuation-in-part of Ser. No. 254,374, Jun. 9, 1994, abandoned.

[51] Int. Cl.[6] ............................................. A47F 5/00
[52] U.S. Cl. .................................. 248/281.11; 248/183.1; 248/652
[58] Field of Search ................................ 248/278, 176, 248/183.1, 281.1, 652, 661, 664; 352/243; 354/81, 293; 474/133

[56] References Cited

U.S. PATENT DOCUMENTS

| | | | |
|---|---|---|---|
| 3,071,980 | 1/1963 | Brewer | 474/133 |
| 4,003,584 | 1/1977 | Zelli | 280/91 |
| 4,257,619 | 3/1981 | Fisher | 280/91 |
| 4,360,187 | 11/1982 | Chapman | 254/8 R |
| 4,950,126 | 8/1990 | Fabiano et al. | 414/590 |
| 5,037,068 | 8/1991 | Grottesi | 254/8 B |

OTHER PUBLICATIONS

Super PeeWee & Super PeeWee II—Setting the Standard ... Worldwide Brochure by Chapman, Leonard Studio Equipment, Inc.

*Primary Examiner*—Leslie A. Braun
*Assistant Examiner*—Gwendolyn W. Baxter
*Attorney, Agent, or Firm*—Lyon & Lyon LLP

[57] ABSTRACT

An attachment for a camera dolly arm includes an attitude control system for maintaining a camera platform at a uniform attitude as the arm is raised and lowered. The attitude control system advantageously includes a lower disk joined to an upper disk by leveling rods. A head is pivotally mounted on a frame between two support plates which attach to the upper end of the dolly arm. The attachment may be used as a riser to elevate the camera platform. The attachment may also be used as an extension of the camera dolly arm, to increase the range of arm travel.

16 Claims, 11 Drawing Sheets

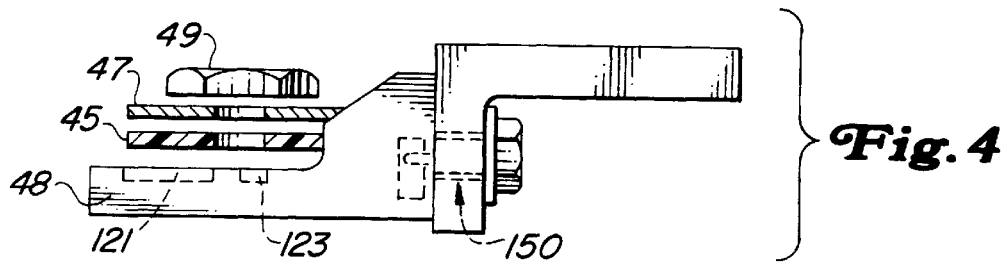
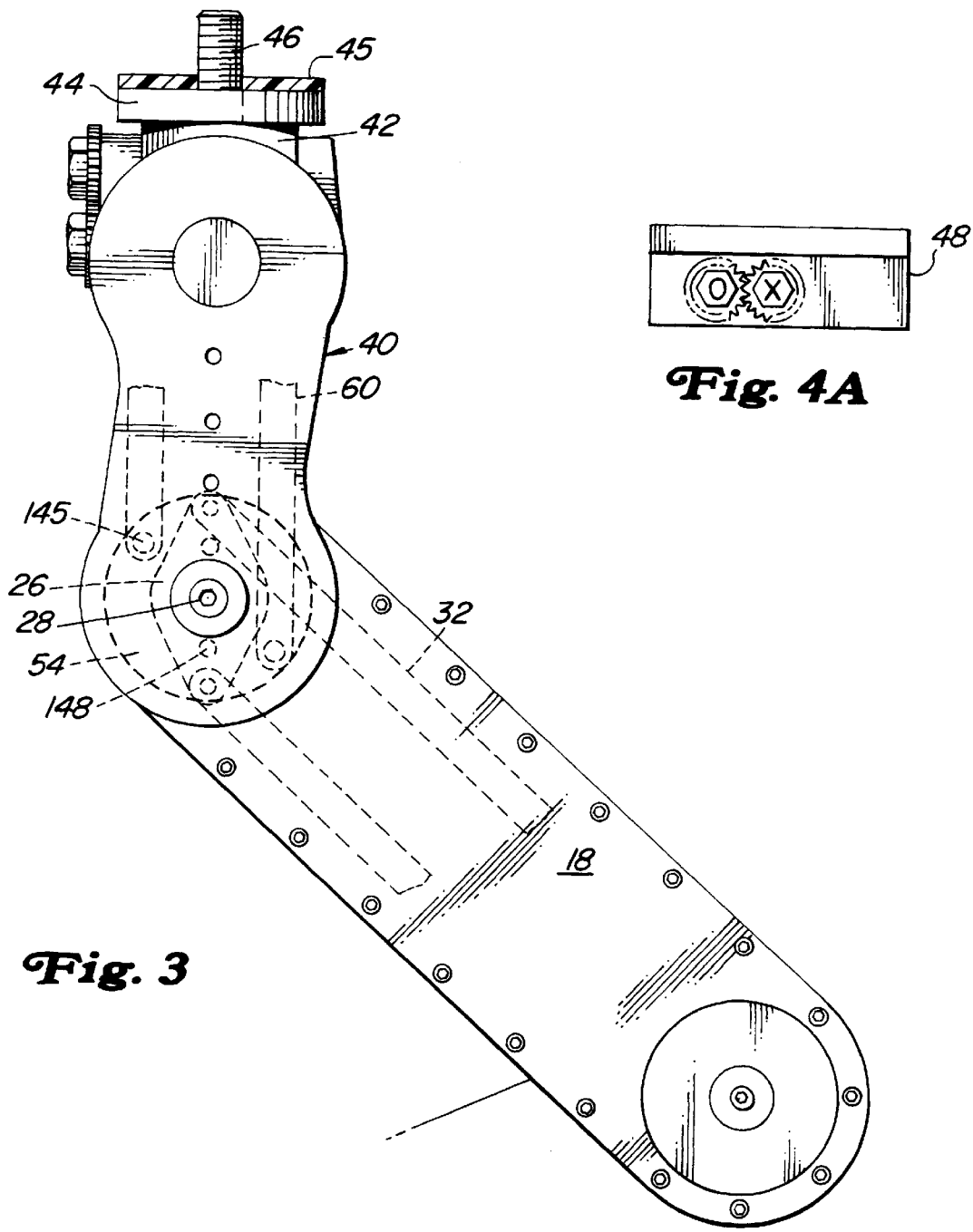

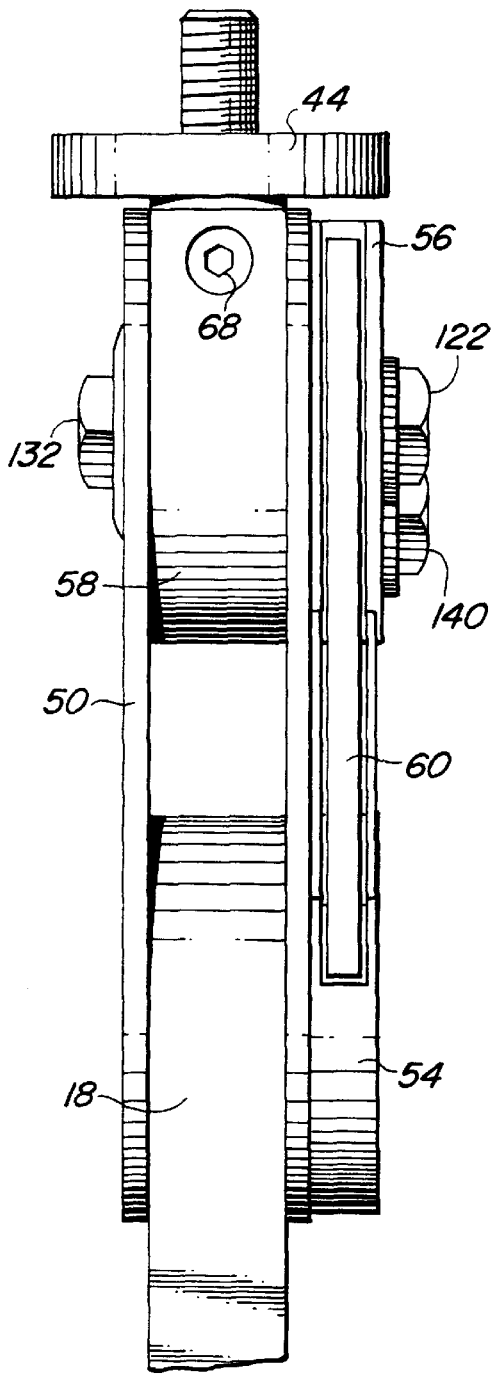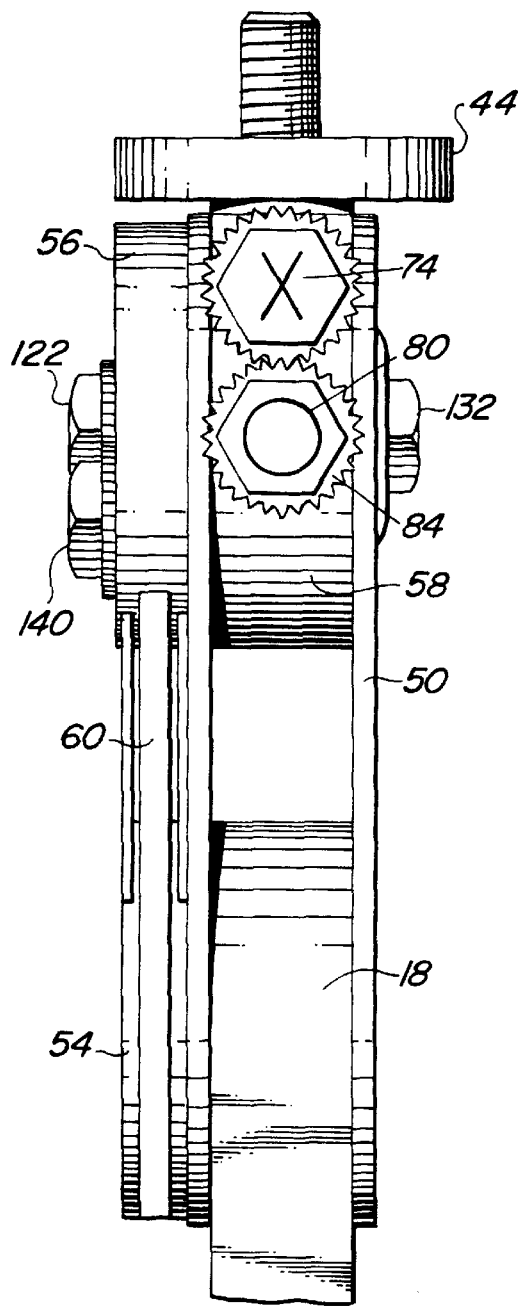

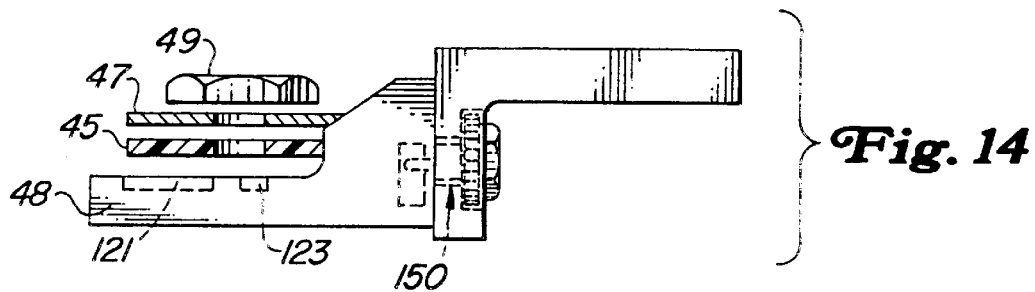
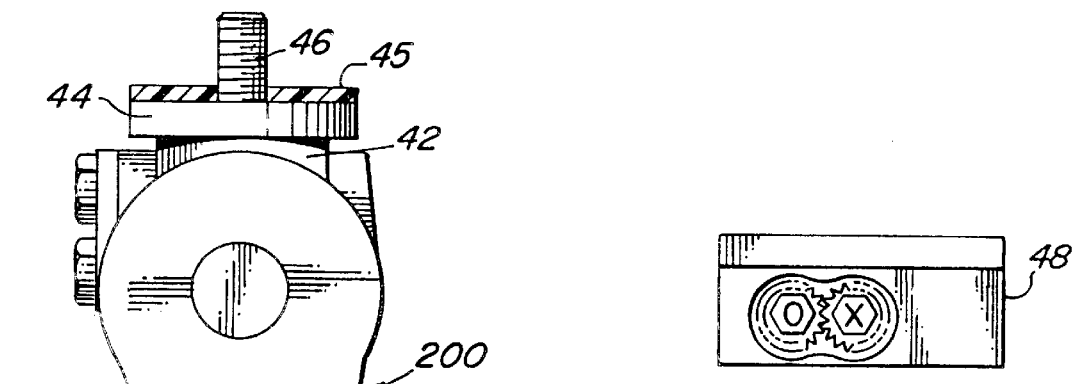
Fig. 14
Fig. 14A
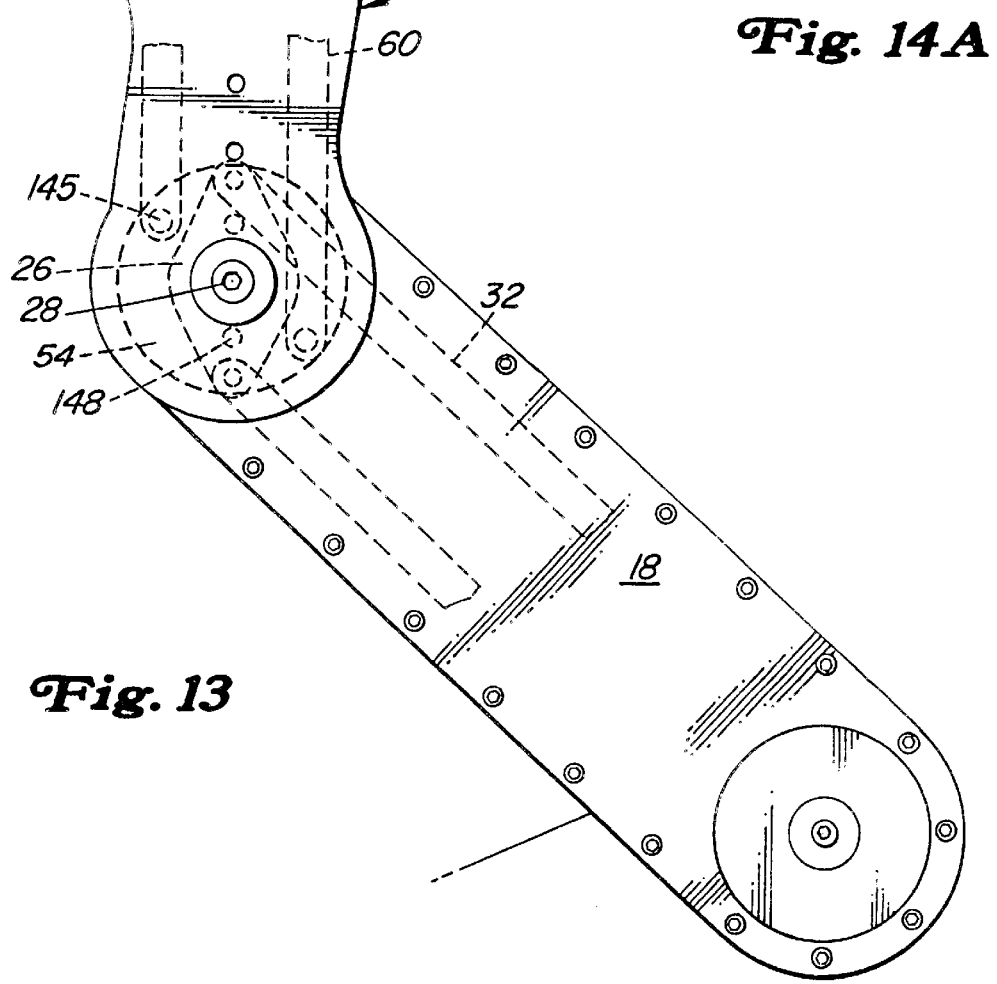
Fig. 13

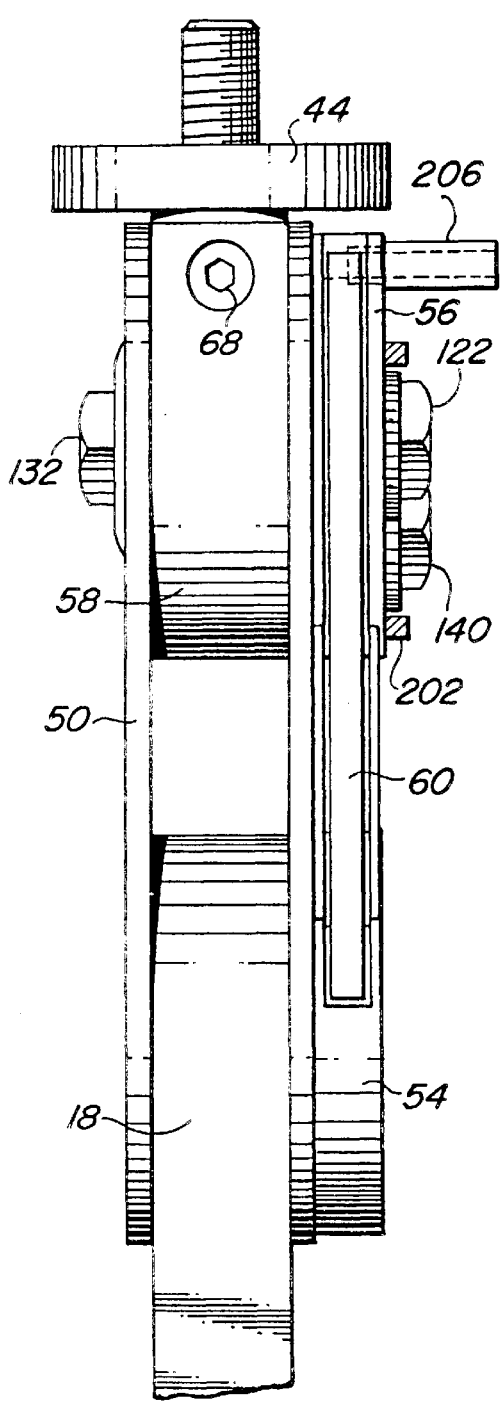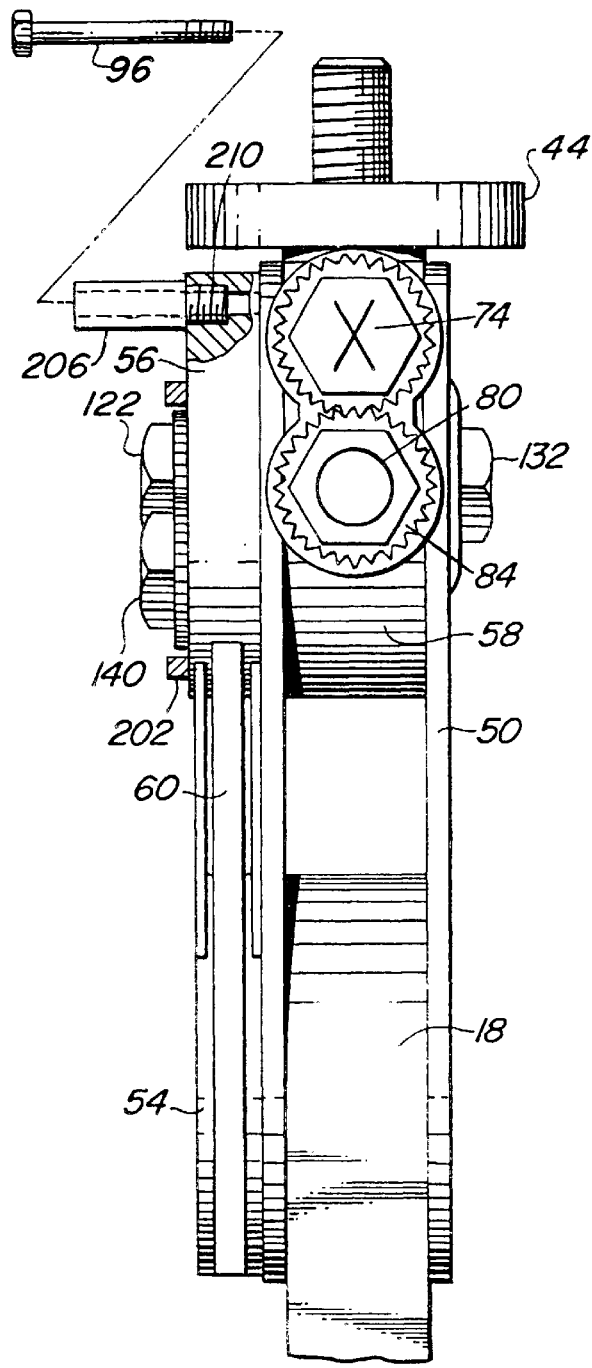
Fig. 17
Fig. 18

CAMERA DOLLY ARM ATTACHMENT

This application is a continuation-in-part of my U.S. patent application Ser. No. 08/254,374, filed on Jun. 9, 1994 and now abandoned on Jan. 23, 1996. The contents of that application are incorporated herein by reference.

BACKGROUND OF THE INVENTION

Camera dollies are frequently used in filming motion pictures. The camera dolly provides a rolling support for a motion picture camera, and allows the camera to be quickly and smoothly maneuvered into positions to achieve desired camera angles. The camera dolly also provides a platform for the camera operator, cinematographer or others to ride on, with the camera, during filming. Many camera dollies have a column or arm for raising and lowering the camera. Preferably, the steering and rolling movement of the camera dolly, and the raising and lowering of the camera by the dolly column or arm should be smooth to avoid jarring or vibration of the camera. In addition, the dolly movement should be silent, to avoid interfering with sound recordings made simultaneously with the filming.

Small camera dollies have several advantages. They can be readily lifted and carried by hand to remote locations and can operate in small spaces, for example, through doorways. Small camera dollies can also be more easily pushed and steered by a single dolly grip or operator. However, small camera dollies have a limited maximum camera height and payload. Large camera dollies can provide for greater camera heights and payloads, but may be too heavy to be lifted and carried to a remote location, or to be maneuvered without a built in motor drive system and batteries. Small spaces, e.g., doors and hallways may also be inaccessible to a larger dolly.

To position a camera close to the floor, for very low camera angles, drop-down attachments are often used with camera dollies. A drop-down plate can be attached to the dolly arm and extend towards the floor, to achieve a much lower camera angle than would otherwise be available. However, to use the drop-down plate or accessory, the camera must be removed from the camera dolly arm, the plate accessory installed, and the camera remounted on the plate accessory. And then it must be releveled. This changeover may require 5 to 10 minutes to perform, a costly delay during filming of motion pictures, where large numbers of people, and large amounts of equipment are involved.

Accordingly, there is a need for a camera dolly having the advantages of small size and low weight, but having the height range of a larger camera dolly. There is also a need to be able to achieve very low camera angles with a camera dolly, without the time-consuming use of a drop-down plate. The added advantage of spatial adjustment capability to allow for operator comfort is of great need, especially for small dollies.

SUMMARY OF THE INVENTION

To these ends, an attachment for a camera dolly arm includes an attitude control system for maintaining the camera platform horizontal, as the dolly arm is raised and lowered. The attitude control system is linked to the attitude control mechanism of the arm. The attitude control system of the attachment preferably uses the parallelogram linkage design. Advantageously, the attachment includes a camera platform leveling system for leveling the camera platform in two directions. The attachment may be used as a camera riser, or as an extension of the arm, to achieve low camera angles and a greater range of travel. The attachment may also be used in intermediate positions. Using the attachment significantly reduces the time and complexity involved, in switching the camera mounting between low, medium, and high camera angles, and in leveling the camera platform. Time is also saved with the new capability of position adjustment now made possible without the need to remove the camera.

BRIEF DESCRIPTION OF THE DRAWINGS

In the drawings, wherein similar reference characters denote similar elements throughout the several views:

FIG. 3 is a side elevation view showing the present camera dolly arm extension or attachment installed on to the camera dolly arm of FIGS. 1 and 2;

FIG. 4 is a side elevation view of a swing plate;

FIG. 4A is a reduced front elevation view thereof;

FIG. 7 is a rear elevation view thereof;

FIG. 8 is a front elevation view thereof;

FIG. 13 is a side elevation view showing a second preferred embodiment of the present camera dolly arm extension, installed onto the camera dolly arm of FIGS. 1 and 2;

FIG. 14 is a side elevation view of a second embodiment of a swing plate;

FIG. 14a is a reduced front elevation view thereof;

FIG. 17 is a rear elevation view thereof;

FIG. 18 is a front elevation view thereof; and

DETAILED DESCRIPTION OF THE DRAWINGS

Figure 1:
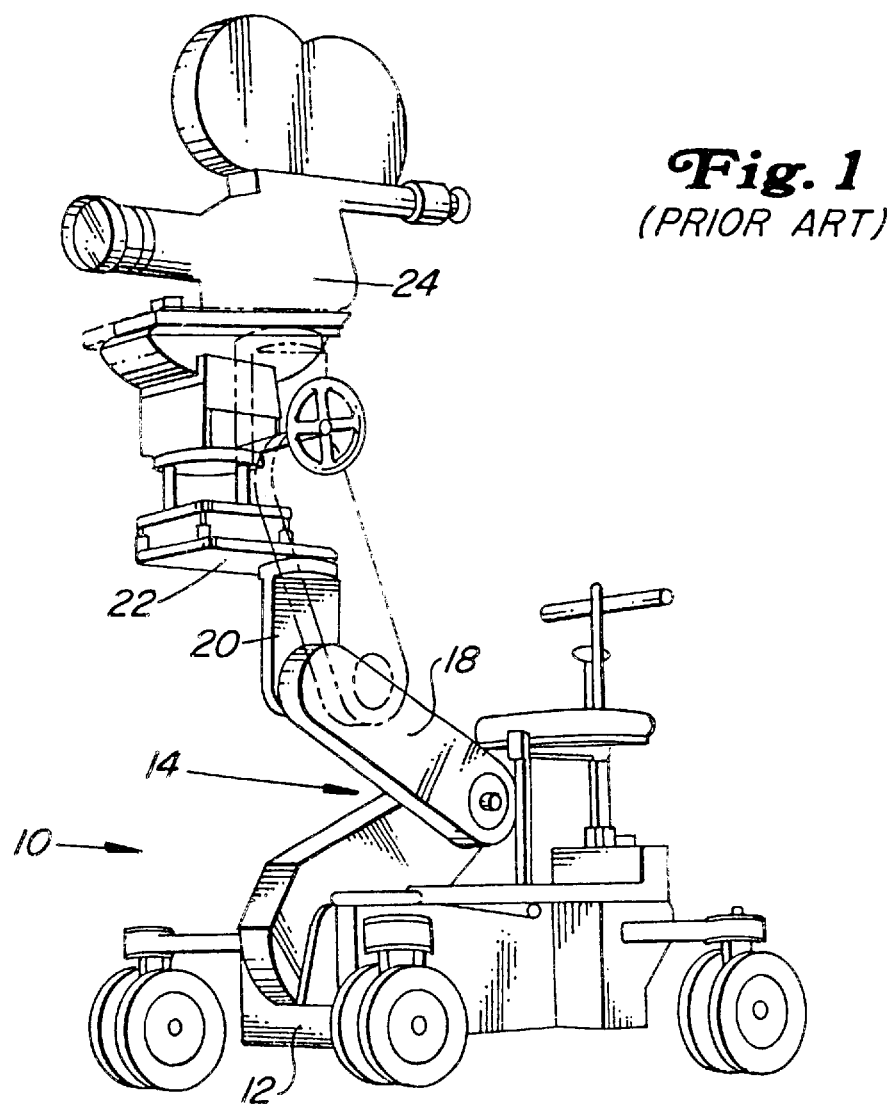
FIG. 1 a perspective view of a motion picture camera mounted on to a camera dolly.
Figure 2:
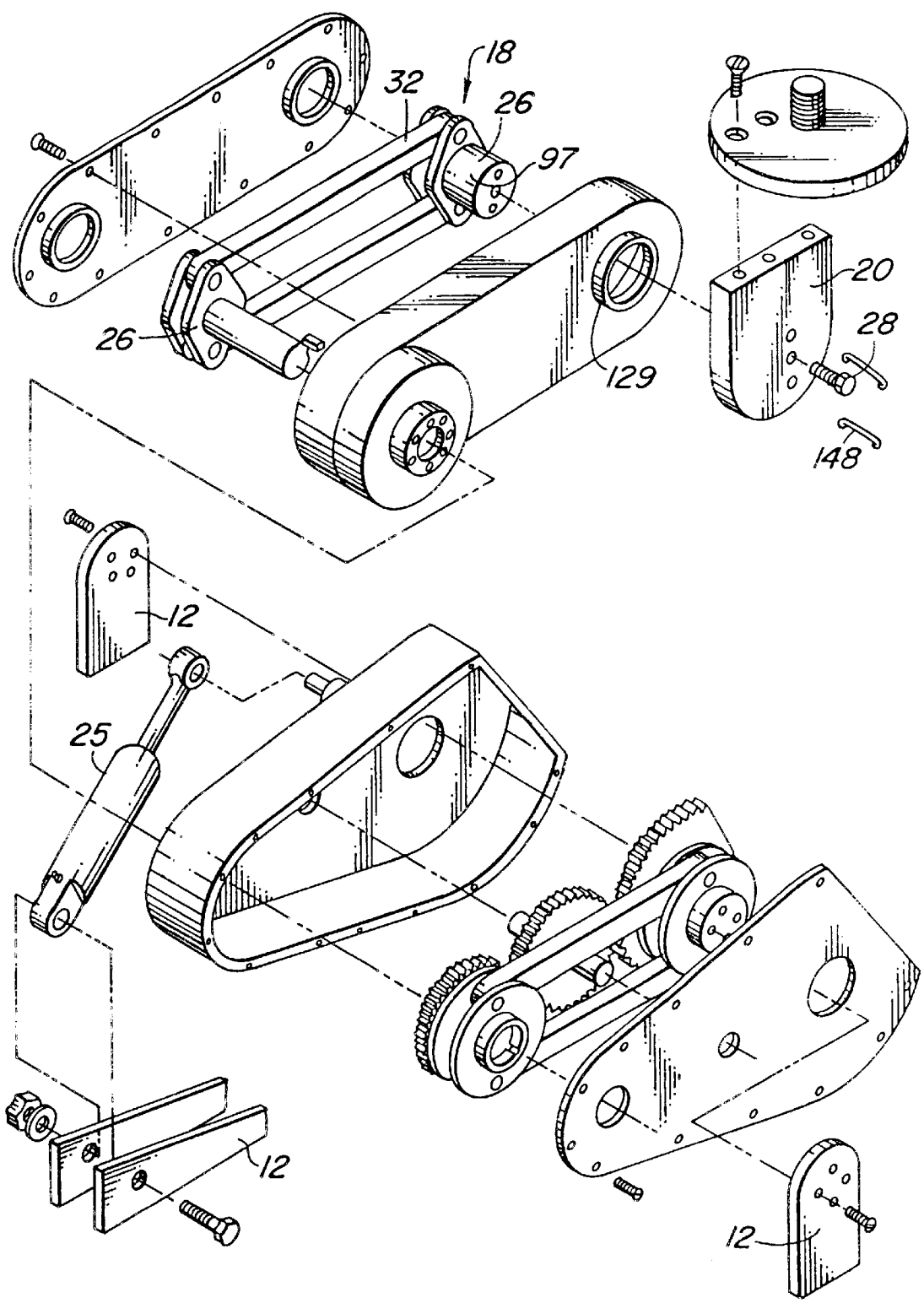
FIG. 2 is an exploded perspective view of the arm of the camera dolly of FIG. 1.
Figures 5, 6:
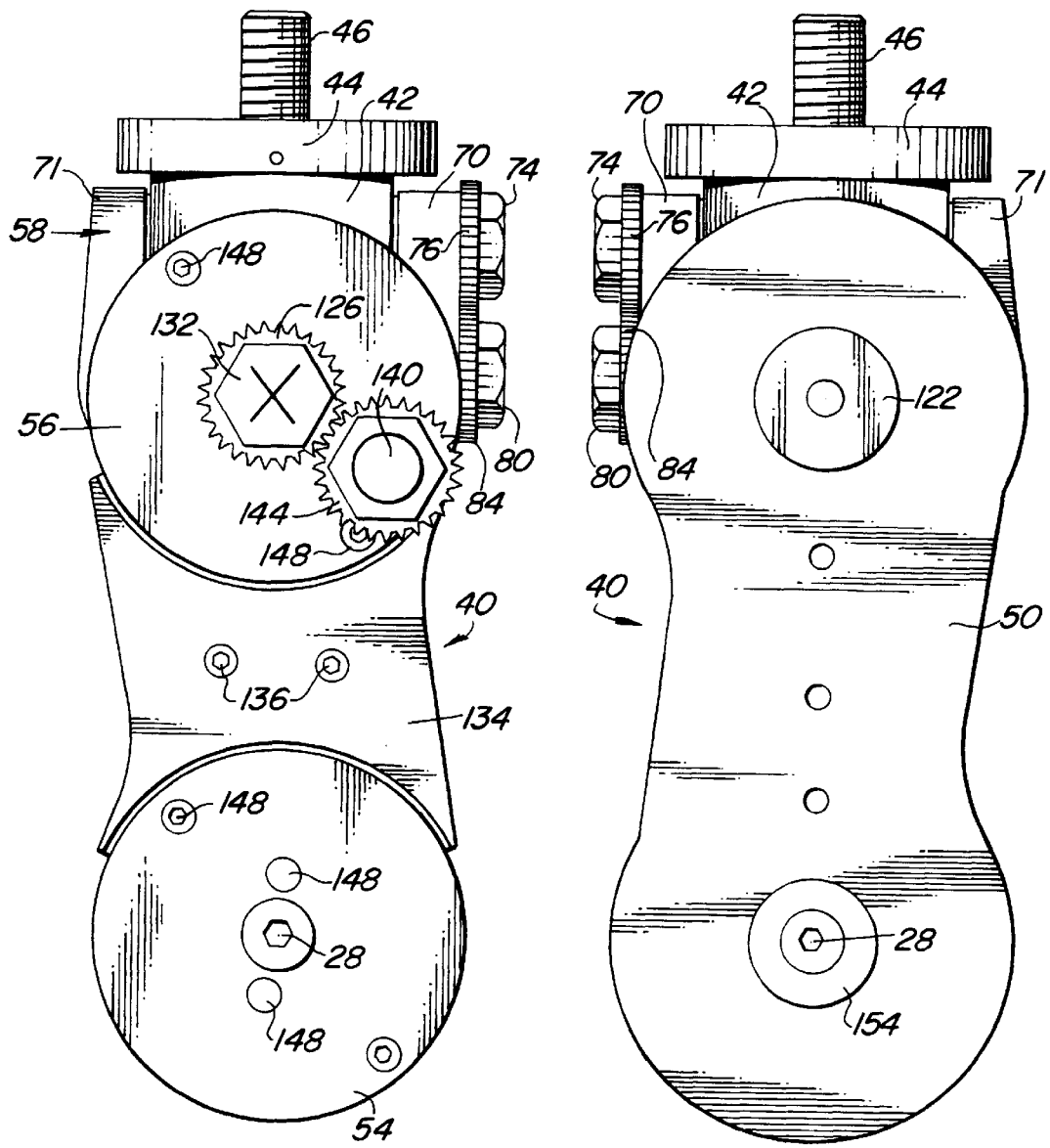
FIG. 5 is a right side elevation view of the present camera dolly arm attachment.
FIG. 6 is a left side elevation view thereof.

Turning now to the drawings, as shown in FIG. 1, as is well known, a camera dolly 10 has a chassis 12, including an arm 14 for raising and lowering a motion picture camera 24. The arm 14 may be of the straight boom type arm as shown, for example in U.S. Pat. Nos. 4,003,584 and 4,257,619, or it may be a pivoting arm, as shown, for example, in FIG. 1, and in U.S. Pat. Nos. 4,950,126 and 5,037,068. The arm 14 as shown has a lower section 16 pivotably attached to the chassis 12, and an upper section 18 pivotably attached to the lower section 16. A nose piece 20 is bolted onto an arm disk 26, which is turned by leveling rods 32, as the arm 14 is raised and lowered by a hydraulic cylinder 25. The leveling system shown in FIG. 2 is described in detail in my U.S. Pat. No. 4,360,187, incorporated herein by reference. The camera 24 supported on a platform 22 attached to the nose piece 20 accordingly maintains its orientation as it is raised and lowered.

Referring to FIGS. 3–9, the arm attachment includes a head 42 having a top plate 44. A swing plate 48, as shown in FIG. 4, may be attached to the top plate 44, to support a camera. A stud 46 projects upwardly from the top plate 44 through Teflon washers 45, steel washer 47 and lock nut 49, to secure the swing plate 48 or other accessory.

Figure 9:
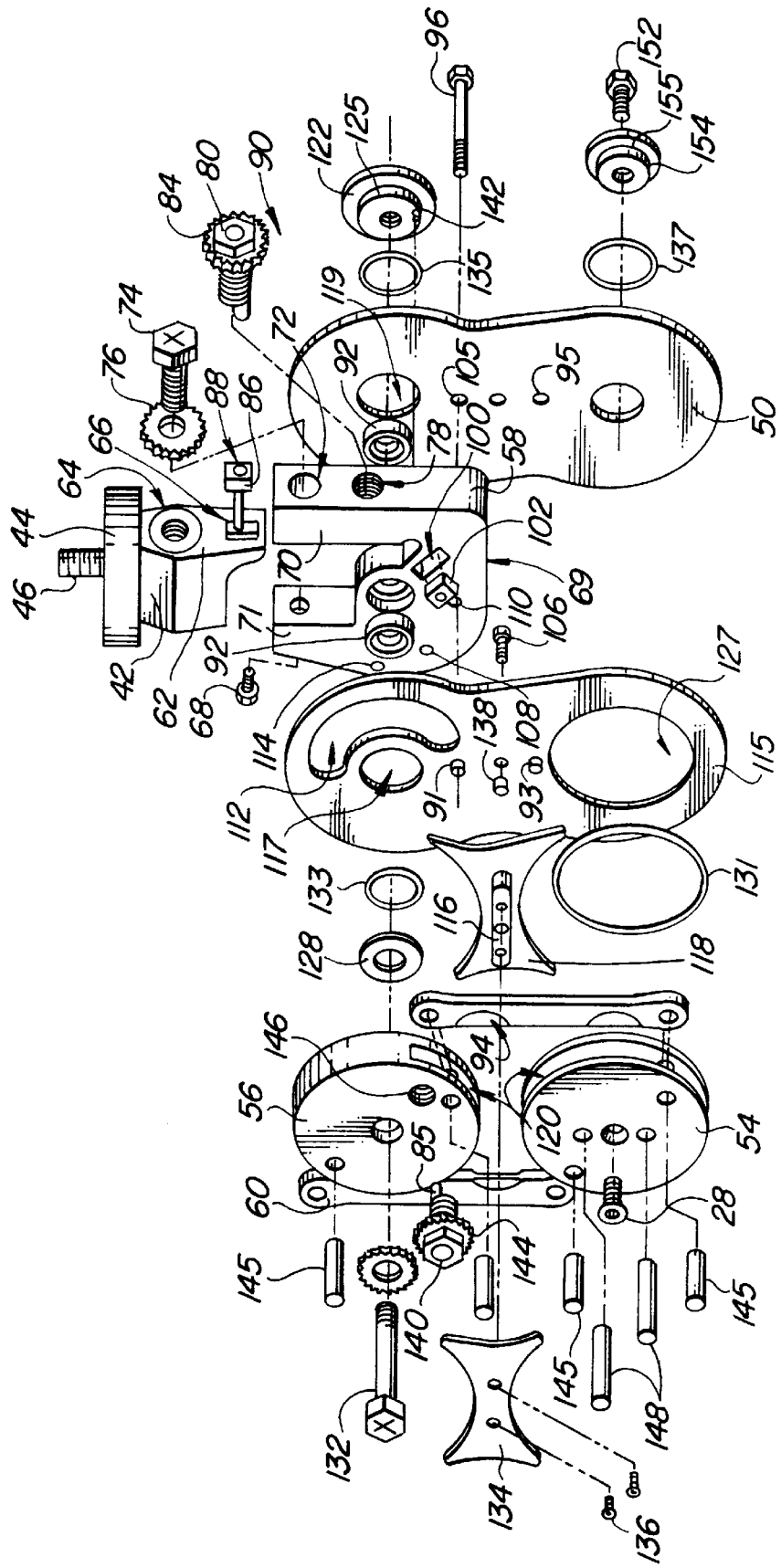
FIG. 9 is an exploded perspective view of the present camera dolly arm attachment.

Referring to FIG. 9, the head 42 has a threaded pivot hole 64 on its flat front surface 62. A slider cam 86 having a drive pin hole 88 is slidably positioned within a head cam slot 66. The head 42 is pivotably mounted to a U-shaped frame 58, having a flat bottom 69, a front leg 70 and a rear leg 71. A rear leg bolt 68 extends through the rear leg 71 of the frame 58 and threads into a hole on the back surface of the head 42. A first head pivot X bolt 74 extends through a pivot spur gear 76 and a clearance hole 72 in the front leg 70, and engages the threaded pivot hole 64, on the front of the head 42. The head is therefore pivotably supported on the frame 58 by bolts 68 and 74.

Referring still to FIG. 9, a head cam spur gear 84 is irrotatably attached to a head pin O bolt 80 which threads into a threaded hole 78 on the front leg 70, below the clearance hole 72. A pin 82 eccentrically positioned on the head pin O bolt 80 extends outwardly into the drive pin hole 88 in the slider cam 86.

The frame 58 is positioned in between a first side support plate 50 and a second support plate 115. A cross bolt or second X bolt 132 extends through a spur gear 126, a center clearance hole in the upper disk 56, a clamping ring 128, the support plate 115, two ball bearings 92 within the frame 58, through the side plate 50, and engages a threaded shoulder ring 122. The clamping ring 128 is slightly thicker than the plate 115. The ball bearings 92 pivotably support the frame 58 on the X bolt 132. The shoulder ring 122 has a shoulder 125 which is slightly higher than the thickness of the side support plate 50. A pin 142 on the shoulder 125 extends into a bore in the frame 58, so that the shoulder ring can rotate only with the frame 58.

A bow tie-shaped disk plate 118 is positioned on the support plate 115 by a plate pin 138, and is secured by a boss screw 106 which extends through the plate 115 into a threaded center hole on a boss 116 attached to the disk plate 118.

The upper disk 56 is linked to a lower disk 54 by leveling rods 60 secured to the disks 54 and 56 with pins 145. The ends of the leveling rods 60 are positioned within the slots 120 in the disks 54 and 56. The links 60 have cut outs 94 to provide clearance.

The frame 58 also has an elevation slider cam 102 with a drive pin hole 104, slidably positioned in an elevation cam slot 100. An elevation bolt or second O bolt 140 having an irrotatably attached spur gear 144 extends through a threaded hole 146 in the upper disk 56, and through a crescent slot 112 in the support plate 115. A drive pin 85 eccentrically positioned on the end of the elevation bolt 140 extends into the drive pin hole 104 on the elevation slider cam 102.

A cover plate 134 fits closely in between the upper and lower disks 54 and 56 and is secured onto the boss 116 by screws 136. A lockout or position securing bolt 96 passes through a lockout hole 105 in the side plate 50, through a clearance hole 110 in the frame 58 and threads into a threaded hole 91 in the support plate 115. Alternatively, as described below, the lockout bolt 96 may be positioned in lockout hole 95 and bypass the frame 58 and thread into a threaded hole 93, or it may pass through other clearance holes 108 or 114, depending on the intended use. The lockout bolt may be a conventional bolt, or a screw or cam driven expanding pin may be used to provide a play-free connection.

Referring to FIGS. 3 and 9, the lower disk 54 is attached to the arm disk 26 by disk link pins 148, and by a cap screw 28 which threads into the central hub of the arm disk 26. Referring to FIG. 9, a plate screw 152 passing through a bushing 154 threads into a threaded hole on the opposite side of the arm disk. (To install the attachment, the nose bracket 20, shown in FIGS. 1 and 2 is removed.) The shoulders on the bushing 154 and threaded shoulder ring 122 allow the attachment 40 to be tightly bolted onto the arm, without clamping the plates 50 and 115. The plates are free to pivot about the end of the arm, even with the bolts 132, 28 and 152 tightened.

Referring still to FIG. 9, since the clamping ring 128 is slightly thicker (for example, 0.010 inches thicker) than the plate 115, and the shoulder 122 is similarly slightly thicker or wider than the plate 50, when the cross bolt 132 is tightened, the frame 58 is frictionally locked with the upper disk 56, but is free to move relative to the plates 50 and 115. The upper disk 56 is spaced apart slightly from the plate 115. The clamping ring 128, as compressed by the cross bolt 132, clamps against the sides of the frame 58 and secures the ball bearings 92. The plates 50 and 115 may advantageously have UHMW liners on their inner surfaces, to reduce friction between the plates and the sides of the upper arm 18.

The clamping ring 128 is journalled in a bushing 133, as shown in FIG. 9. The shoulder 125 of the shoulder ring 122 is journalled in a bushing 135. The tube 129 on the upper arm 18 (FIG. 2) is journalled in a bushing 131. The shoulder 155 of the shoulder bushing 154 is journalled in a bushing 137. Preferably, the bushings 131, 133, 135 and 137 are Garlock DU bushings.

Figure 10:
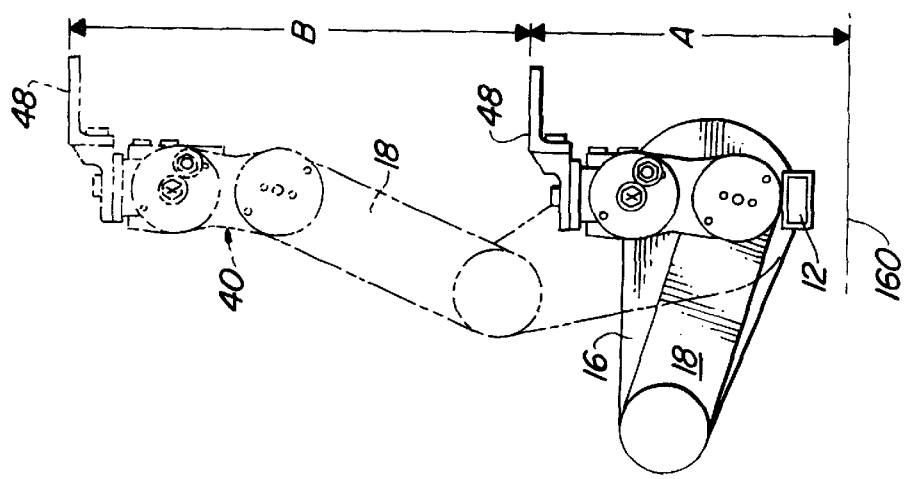
FIG. 10 is a schematic illustration showing use of the present attachment as a vertical camera riser.

In use, the attachment 40 provides several advantageous functions. As shown in FIG. 10, the attachment 40 may simply be used as a riser, similar to the nose piece 20 on existing camera dollies. For this use, the nose piece 20 is removed and the attachment 40 is secured to the upper arm 18 as shown in FIG. 10 and is vertically positioned. The support plate 50 is swung out of the way. The large hole 127 is placed over the tube 129 which supports the hub of the disk 26 which protrudes slightly from the tube 129 of the upper arm 18. The plates 50 and 115 can pivot independently of each other, so that plate 115 can first be positioned and aligned on the arm, followed by positioning of plate 50, by swinging it into place. It is important to note that the friction in journal holes 117 and 119 is best reduced with the use of a Garlock DU bushing or ball bearings.

Specifically, the pins 148 and bolts 28 and 152 are installed to attach the lower disk 54 to the hub of the arm disk 26. Bolts 132, 140, 68, 74 and 80 are tightened during manufacture assembly of the attachment 40, and remain tightened, except as described below. The large hole 127 at the lower end of the support plate 115 provides clearance to allow the hub of the arm disk 26 to attach flush against the lower disk 54. The large hole 127, during adjustment, pivots on the outside diameter of a housing 97 that supports bearings for the hub of the disk 26. The lockout bolt 96 is installed through the lockout hole 105 on the side plate 50, passes through the frame 58 and threads into the support plate 115. When installed in this way, the lock-out bolt 96 mechanically locks the attachment 40 to the arm disk 26, so that the attachment 40 remains in the vertical position. Specifically, the arm disk 26 is pinned to the lower disk 54, which in turn is joined to the upper disk 56 by the links 60. The upper disk 56 is in turn mechanically clamped onto the frame 58 via the clamping ring 128 (and the shoulder 125 on the shoulder ring). As a pivoting movement by the attachment 40 around the arm disk 26 would require relative movement between the frame 58 and plates 50 and 115, such movement is prevented by the lock-out bolt which locks the frame to the plates, and maintains the attachment 40 in the vertical position shown in FIG. 10. As the arm 14 of the dolly 10 is raised or lowered, the attachment 40 maintains the swivel plate 48 (and a camera mounted on the swivel plate) in a uniform horizontal position, similar to a conventional riser or nose piece 20.

The attachment 40 provides exceptionally quick and secure camera platform leveling in both the lateral (side to side) and elevational (front to back) directions. The swing plate 48 has sight levels 121 and 123 (FIG. 4) oriented at right angles to each other. Referring to FIG. 9, to level the swing plate 48 (and correspondingly the camera 24) in the lateral direction, the head pivot bolt (first X bolt) 74 is loosened, using a wrench. As the bolt 74 is turned, the spur gear 76 around the bolt remains stationery. With the head pivot bolt 74 loosened, the head 42 can be pivoted on the head pivot bolt 74. The head pin bolt (first O bolt) 80 is then turned with a wrench while watching the lateral sight level 110. As the head pin bolt 80 is turned, the pin 82 forces the slider cam 86 to one side, causing the head 42 to pivot around the head pivot bolt 74, thereby shifting the orientation of the top plate 44 and swing plate 48. As the head pin bolt 80 is turned, the vertical movement component of the pin 82 slides the cam slider 86 vertically in the head cam slot 66, without effect, whereas the horizontal component of the movement pivots the head 42. The thread engagement of the head pin bolt 80 and the support of the head 42 on the frame 58 preferably have sufficient friction to prevent movement, unless the bolt is turned with a wrench.

After the lateral sight level 110 indicates that the swing plate 48 is level (in the lateral direction) the head pivot bolt 74 is tightened, causing the front leg 70 of the frame 58 to press against the front surface 62 of the frame and frictionally lock the frame and head together. In addition, the tightened pivot bolt 74 frictionally locks the pivot spur gear 76 against the front leg 70, which in turn locks the head pin bolt 80 in position, providing a second locking mechanism against lateral pivoting movement of the head 42, after it has been leveled. That is, the slider cam 86 which fits with close tolerance in the slot 66 also helps to prevent inadvertent movement of the head 42. A pin 90 on the spur gear 84 limits the maximum rotation of the head pin bolt 80 to 180 degrees (preferably corresponding to plus or minus 8 degrees of leveling movement). In summary, the head 46 is leveled laterally by loosening the (first) X-bolt 74, adjusting the (first) O-bolt 80, and retightening the X-bolt 74.

To level the head 42 in elevation, a similar method is followed using the cross bolt 132 and elevation bolt 140. Referring still to FIG. 9, the (second) X-bolt or cross bolt 132 is loosened. The spur gear 126 remains stationery. The elevation bolt or (second) O-bolt 140 is then turned, while viewing the elevation sight level 108. As the elevation bolt 140 turns, the pin 85 drives the elevation slider cam 102, causing the entire attachment 40 to pivot about a centerline passing through the bolts 28 and 152. While the disk 54 remains non-rotating and stationary with the disk 56 moving forward and back with adjustments, the attitude of disk 56 is maintained by rods 60. The frame 58 cannot turn relative to the plates 50 and 115. Consequently, the torque on the bolt 140 and reaction of the slider cam 102 on the frame causes the entire attachment 40, other than the disk 54, to pivot slightly to bring the head into a level orientation. When the elevation sight level 108 shows the swing plate 48 to be level, the cross bolt 132 (second X-bolt) is tightened, once again clamping the upper disk 56 to the frame 58, via the clamping ring 128 and shoulder 122.

The head 58 is essentially fixed to and can only move with the upper disk 56. The spur gear 126 is clamped against the side of the upper disk 56, and since it is meshed with the spur gear 144 fixed to the elevation bolt 140, the frame 58 is again double locked against movement, after it has been leveled. Leveling in elevation is accordingly also performed with the X-O-X pattern.

Preferably, the swing head 48 includes a second lateral leveling system 150, similar in design to FIG. 9, to provide an increased range of leveling (e.g., plus or minus 16°) for use in situations where the dolly 10 must be used on a substantially inclined surface. The size and shape of the swing head and the dolly arm allow the swing head to pivot 360° around the stud 46 when the nut 49 is loosened. The swing head can therefore be set at any azimuth position.

Figure 11:
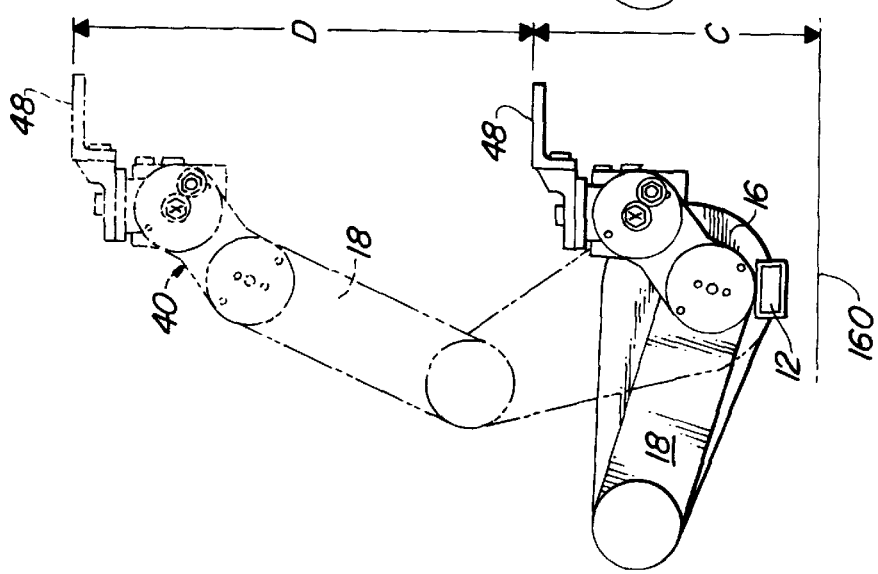
FIG. 11 is a schematic illustration showing use of the present attachment as a diagonal riser.

As shown in FIG. 11, the attachment 40 may also be used as a diagonal riser, to position the camera 24 in an elevated and forward shifted position. For diagonal riser use, as shown in FIG. 11, the lockout bolt 96 is removed, and the top end of the attachment 40 pushed forward. As this occurs, the orientation of the upper disk 56 does not change, due to the leveling effect provided by the leveling rods 60. The clamping of the cross bolt 132 maintains the connection between the frame 58 and the upper disk 56. i.e., frictional clamping is provided between the upper disk 56 and frame 58 via the clamping ring 128. In addition, the frame 58 remains vertically oriented as it turns counter clockwise (reference FIG. 9) relative to the plates, due to the interconnection of the pin 85, slider cam 102, and elevation bolt 140. As this relative movement occurs, the elevation bolt 140 shifts counter clockwise in the slot 112. With the lockout bolt 96 removed, the camera is supported by hand, until the lockout bolt can be installed, e.g., in lockout hole 108 to provide the diagonal position.

In the preferred embodiment of FIG. 10, the top surface of the swing plate 48 is about 21.4 inches (dimension A) above the ground 160, with the arm 14 in the down position. With the arm fully extended, the swing plate rises 32.0 inches (dimension B), which is the lift range of the particular arm 14 of the dolly shown in FIG. 2. Referring to FIG. 11, with the diagonal position, the top surface of the swing plate 48 is about 19.2 inches (dimension C) above the floor 160, and again the elevation provided by the arm 14 is 32.0 inches (dimension D). Of course, these dimensions may vary with the design of the dolly arm or desired length of the attachment 40. The weight lifting and carrying capacity of the dolly 10 is unaffected by use of the attachment 40, as shown in FIGS. 10 and 11, as the (e.g., 32.0 inches) lift of the arm is unchanged.

Of course, various intermediate diagonal positions may be provided for by providing angularly spaced apart lockout holes in the frame and plates, such as the holes 114 and 108 and 110 shown in FIG. 9.

Figure 12:
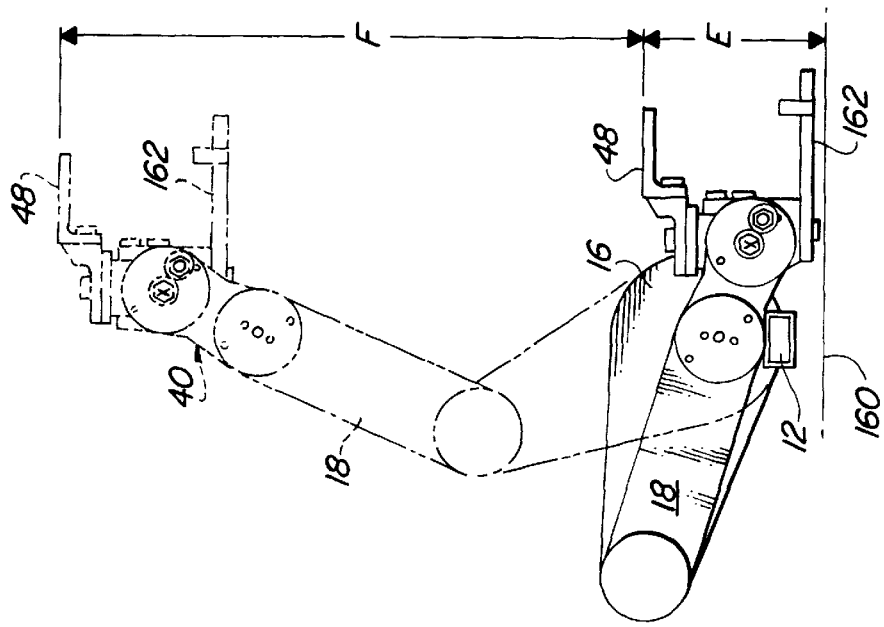
FIG. 12 is a schematic illustration showing use of the present attachment as a dolly arm extension.

Referring to FIG. 12, the present attachment 40 may also be used as an extension of the camera dolly arm 14, to increase the vertical travel range available in which the camera may be raised and lowered.

Referring to FIGS. 9 and 12, to install the attachment 40 as an extension, the lower disk 54 is pinned and bolted onto the arm disk 26, as previously described. The lockout bolt 96 is removed, and the attachment 40 moved (rotated clockwise as shown in FIG. 12) until it is positioned parallel to the axis of the upper arm 18. When so aligned, a center line passing through the centers of the lower disk 54 and upper disk 56, also passes through the centers of the disks 26 in the upper arm 18. As the attachment 40 is moved into alignment, the head 42 and swing plate 48 remain horizontal, as the upper disk 56 moves along a curved path, but does not rotate or change its orientation. The cross bolt 132, which remains tightened, maintains the connection between the upper disk 56 and the frame 58. The lock-out bolt 96 is then installed into lockout hole 95 in the side plate 50, (below the frame 58) extends through a structural tube in the arm, and threads into the corresponding threaded hole 93 of plate 115. The plates 50 and 115 accordingly are friction and pin locked to the upper arm 18 and become an extension of the upper arm 18.

With the attachment installed as shown in FIG. 12, the effective length of the arm 18 is increased, and the swing plate 48 is brought closer to the floor 160. In the embodiment shown, the swing plate is 12.15 inches (dimension E) above the floor 160, i.e., significantly lower than with the uses shown in FIGS. 10 and 11.

Referring still to FIG. 12, as the arm 14 is operated, due to the added length provided by the attachment 40, the travel distance (dimension F), in the embodiment shown, increases to about 40.5 inches. However, the load carrying capacity of the dolly 10 is correspondingly reduced. For exceptionally low camera angle filming, an extension plate 162 may be bolted onto the bottom surface of the attachment 40. Specifically, a bolt extending through the extension plate 162 threads into a threaded hole on the flat-bottom surface of the frame 58. As shown in FIG. 12, the extension plate 162 is positioned just above the floor, and may be leveled as described above with reference to FIG. 10. The increased range of movement achieved using the attachment 40, as shown in FIG. 12, allows a compact and light weight dolly 10 to perform more like a larger camera dolly, but without the size, weight and maneuverability disadvantages.

In a preferred embodiment, the centers of the lower disk 54 and upper disk 56 are spaced apart by about 7 inches. However, the attachment 40 can, of course, be made longer or slightly shorter. However, as the length of the attachment 40 increases, the load carrying capacity of the arm 14 is reduced, and more arc is introduced into the camera's path of travel as the arm moves up and down, when the attachment is used in the arm extension mode shown in FIG. 12.

A significant advantage of the present attachment 40 is that switching the camera from mounting positions on the swing plate 48 or the extension plate 162, to go back and forth between very low camera positions and mid-range or high camera positions, can be achieved very quickly. To make the change over, the lock-out bolt 96 is removed from the lock-out hole 95 or 105, the attachment 40 is pivoted or moved around the arm disk 26 to its new position, and the lock-out bolt 96 reinstalled. The camera 24 need not be removed from the swing plate 48, and no hardware or components attaching the camera 24 to the swing plate 48 need be manipulated. No releveling is required. Consequently, the camera position changeover may be made very quickly, in contrast to the prior art methods of unbolting the swing plate 48, repositioning it on the arm 14, and then releveling the camera. Accordingly, with the present attachment 40, the camera position may be switched over in a matter of seconds, rather than the 5–10 minutes typically required with the conventional camera dollies and accessory plates.

Alternatively, the camera may be placed on the extension plate 162, to achieve all but the highest camera positions, without any changeover required.

As leveling is achieved below the swing head 48, the camera can also be swung around the mounting stud 46, without the need to relevel it, a significant time saver during filming. The attachment 40 is also very compact compared to the extension plates and leveling equipment it can replace.

FIGS. 13–19 show an alternative preferred embodiment 200 of the present camera dolly arm attachment. Referring to FIGS. 13, 14 and 14a, the second embodiment 200 is similar to the first embodiment shown in FIGS. 3–12, but also includes several improvements. Referring to FIG. 13, a gear housing 202 around the spur gears on the side of the attachment 200 helps to prevent the gears from inadvertently pinching an operator's finger. The gears are recessed within the gear housing 202. The spur gears on the front and on the swing head are similarly recessed into counterbores.

Figure 19:
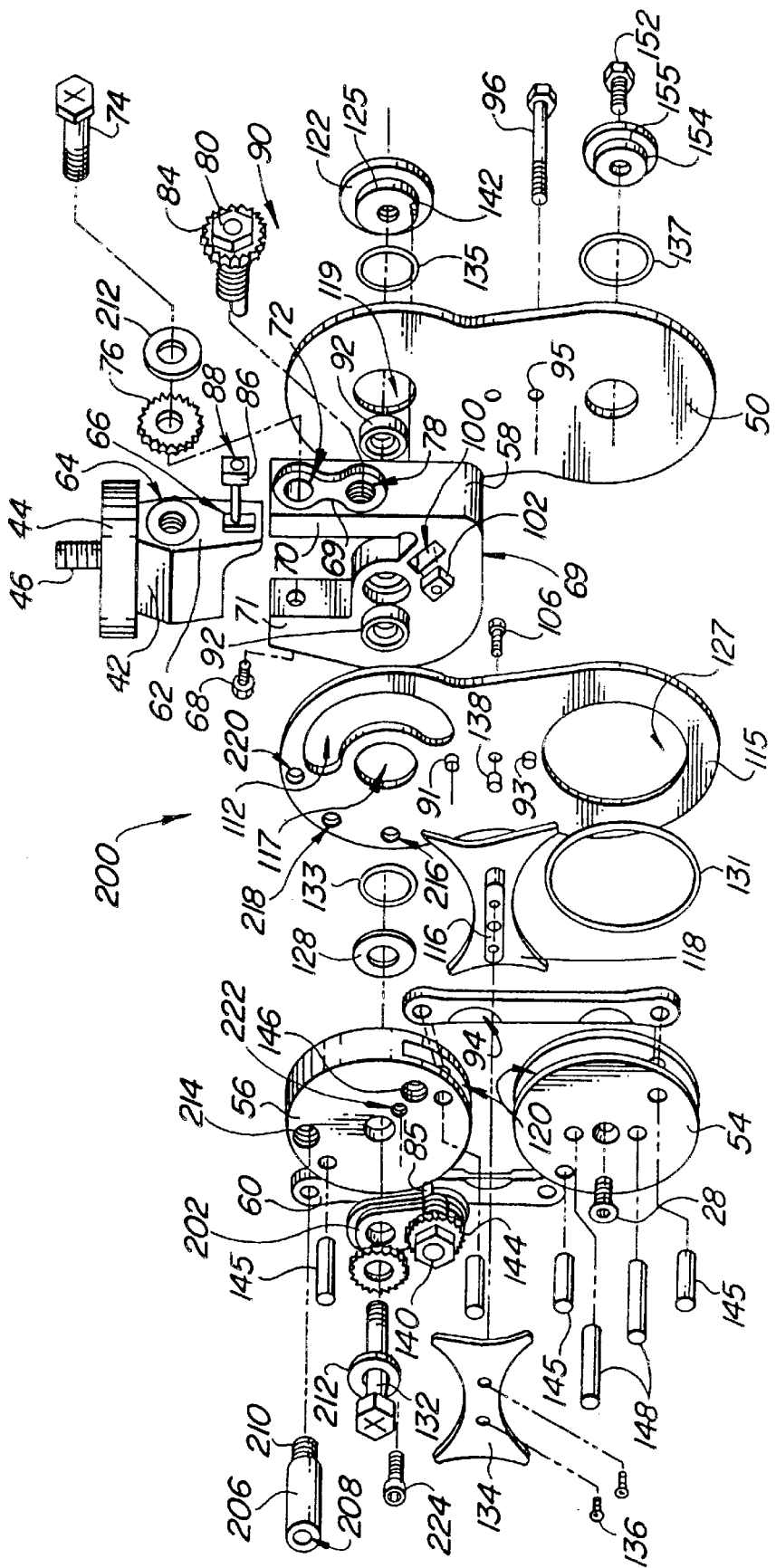
FIG. 19 is an exploded perspective view of the second embodiment of the present camera dolly arm attachment.

Referring now to FIGS. 15–19, a bolt tube 206 has a through bore 208 and a threaded end stud 210 (as best shown in FIG. 19). The diameter of the bore is set to receive the lock out bolt 96. The bore 208 extends entirely through the tube 206 and its threaded end 210. The stud 210 of the tube 206 is threaded into a hole 214 in the upper disc 56. The support plate 115 is provided with 3 holes 216, 218 and 220, at the upper section of the support plate. These holes 216, 218 and 220 replace the holes 108, 110 and 114 as well as 105, in the first embodiment as shown in FIG. 9.

As shown in FIG. 19, a Teflon washer 212 is provided under the head of each of the "X" bolts, i.e., the head pivot bolt 74, the cross bolt 132, and the third X bolt shown in the second lateral leveling system 150 in FIGS. 14 and 14a. The Teflon washer 212 substantially reduces friction between the gear under the X bolt head. This helps to prevent the gear from turning as the X bolt is tightened. Movement of the gear during tightening may cause the top plate 44 supporting the camera to move out of level, after it has been leveled. The Teflon washer 212 generally prevents such undesirable gear movement.

Figure 15:
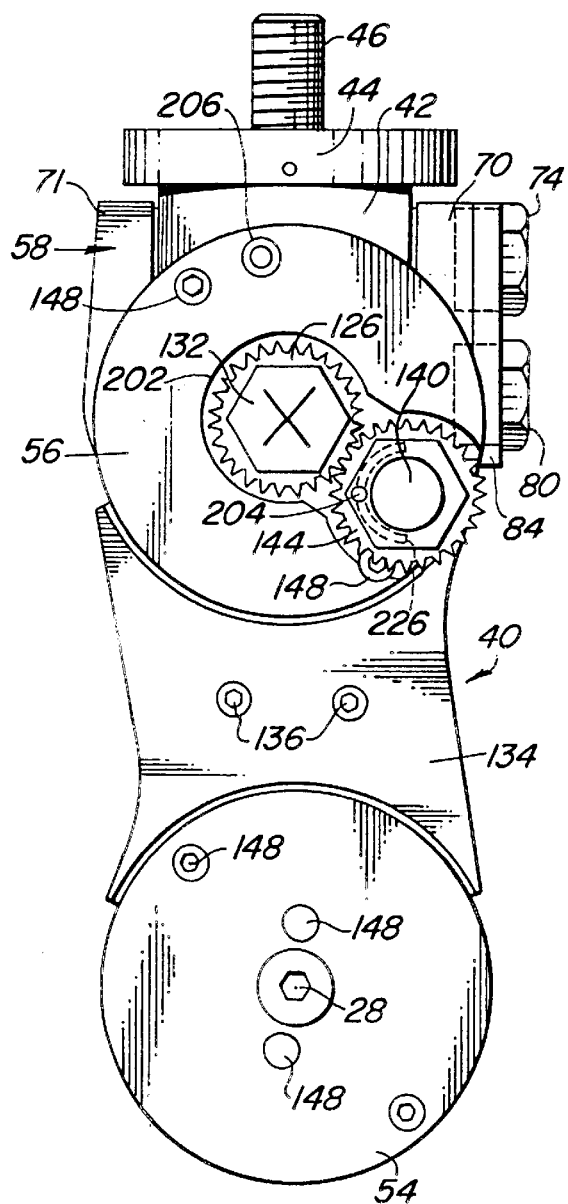
FIG. 15 is a right side elevation view of the second embodiment shown in FIG. 13.
Figure 16:
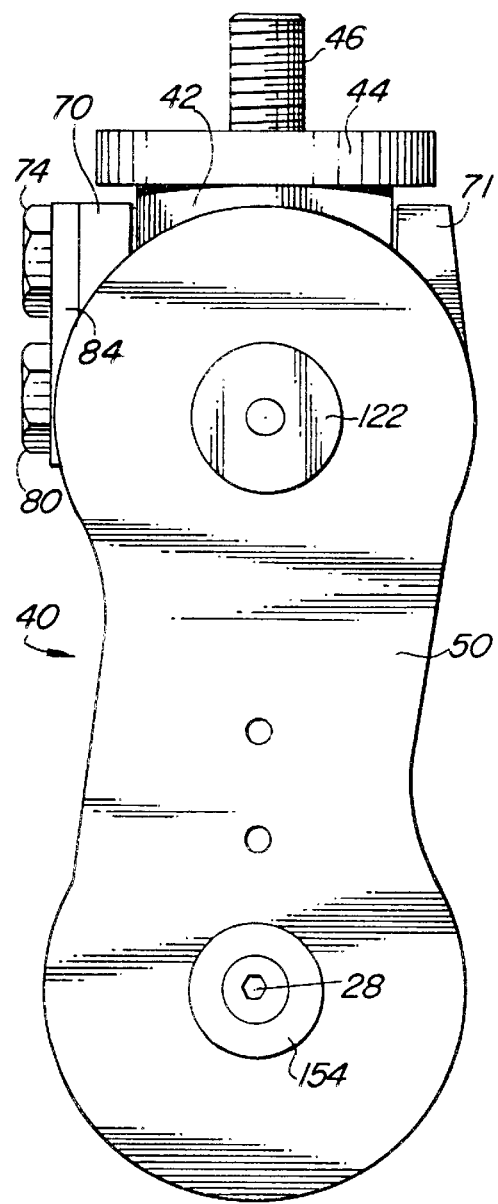
FIG. 16 is a left side elevation view thereof.

Referring to FIGS. 15 and 19, to prevent the O bolts from being excessively loosened, a stop cap screw 224 is threaded into a stop screw hole 222 in the upper disc. As shown in FIG. 15, a corresponding slot 226, adapted receive the head of the stop cap screw 224, is cut into the underside of each O bolt. As the slot 226 extends only about halfway around the diameter of the O bolt, the O bolt can only be turned about ½ turn. This amount of rotation is sufficient to achieve a full range of leveling movement (by moving the associated cam through its full range of travel, as described above with reference to the first embodiment 40). In addition, leveling is simplified and expedited as all leveling movement occurs within ½ turn of the O bolt. In contrast, in the first embodiment of e.g., FIG. 5, the O bolt can be turned continuously around while merely cycling through repeated leveling motions, and also causing the O bolt to back out of the assembly. The stop screw 224 is installed through a clearance hole 204 in the flange of the head of the O bolt, after the O bolt is installed, to prevent the stop screw 224 from interfering during manufacture of the attachment 200.

In use, the attachment 200 performs in a way similar to the attachment 40 shown in FIGS. 3–9. However, with the addition of the bolt tube 206 and holes 216, 218 and 220, improved performance is realized. The lock out bolt 96 may be installed through the lock out hole 95 in the side plate 50, and thread into the support plate 115 via threaded hole 93, bypassing the frame 58. With the lock out bolt 96 installed in this way, the attachment 200 acts as an extension of the dolly arm, and the top plate 44 remains level. This operation is described above with reference to FIG. 12. The attachments 40 and 200 work the same way in the arm extension mode.

The attachment 200 can also be used as a camera riser, by installing the lock out bolt 96 through the bore 208 in the bolt tube 206 while the (straight up position) hole 220 in the support plate 115 is aligned with the tube hole 214 in the upper disc 56. Similarly, the attachment 200 can act as an inclined riser by engaging the lock out bolt 96 through the bolt tube 206 and into the (450 position) hole 218 in the support plate 115. Alternatively, the attachment 200 can provide a drop down feature with the lock out bolt 96 similarly engaged into the (minimum elevation) hole 216. The holes 216, 218 and 220 are all threaded to engage the threads on the lock out bolt 96. The tube hole 214 is threaded to mate with the threaded end 210 of the tube 206, and to allow the lock out bolt 96 to pass through.

A significant difference in leveling between the attachment 200 shown in FIG. 19, and the attachment 40 shown in FIG. 9, is that with the attachment 200, (elevation-front to back) leveling occurs about the axis of the X bolt 132. In contrast, in the attachment 40, (elevation) leveling occurs about the axis of the lower disc 54. As the payload is closer to the leveling axis with the attachment 200, the moment arm is reduced, and the torque on the O bolt required for leveling is decreased, thereby easing leveling operations. In addition, the leveling rods 60 linkage is not involved in (elevation) leveling, thereby allowing leveling with the attachment 200 to be more precise. As fewer components are involved in leveling, friction is also reduced, further decreasing the effort required for leveling.

To further speed up changing positions, the plates and linkages are preferably machined to sufficiently close tolerances so that the straight up position hole 220 will automatically align with the bolt 96 extending through the tube 206 and the hole 214 in the upper disc 56, to allow the bolt 96 to engage into the hole 220, when the attachment 200 is pushed or pivoted upwardly to its full up position. Similarly, with the attachment 40 pushed to its lowest position, the minimum elevation hole 216 will automatically align with the hole 214 to receive the bolt 96.

The length of the tube 206 is set so that the bolt 96 can be used in holes 216, 218 or 220, for (non-arm extension) riser or drop down functions, or in holes 95 and 93 for actual arm extension performance. Thus, the functions of the attachment 200 can be quickly used with placement of the single bolt 96 using a single wrench provided with the attachment 200.

Thus, a novel camera arm attachment has been shown and described. It will be obvious to those skilled in the art that many modifications and variations of this attachment may be made, without departing from the spirit and scope of the present invention.

I claim:

1. A camera platform leveling system comprising:
   a frame;
   a head pivotably mounted to the frame;
   a first cam element extending into the frame and engaging a first cam on the head;
   a first gear fixed to the cam element;
   a second gear meshed with the first gear; and
   a head bolt passing through the second gear and threaded into the head.

2. A camera platform leveling system comprising:
   a frame;
   a head pivotably mounted to the frame;
   a first cam on the head;
   a first cam bolt extending into the frame and engaging the first cam;
   a second cam on the head;
   a second cam bolt perpendicular to the first cam bolt and engaging the second cam; and
   means for locking the first and second cam bolts in place.

3. A camera dolly arm attachment comprising:
   a lower disk;
   an upper disk;
   leveling rods joining the lower disk and the upper disk;
   a support plate;
   a side plate;
   a frame pivotably mounted between the support plate and the side plate;
   a head pivotably mounted on the frame;
   means for linking the upper disk to the frame; and
   a head lateral leveling system comprising:
      a slider cam in a slot on the head;
      a head pin bolt threaded into the frame and having an eccentric pin engaging the slider cam; and
      a head pivot bolt passing through the frame and threaded into the head.

4. A camera dolly comprising:
   a dolly chassis;
   an arm on the chassis, the arm having a lower arm section, and an upper arm section pivotably attached to the lower arm section;
   an actuator for lifting the lower arm section;
   a motion transmission in the lower arm section linked to the upper arm;
   a first attitude control system in the arm;
   an arm extension attached to the upper arm section and independent of the motion transmission;
   a second attitude control system in the arm extension linked to the first attitude control system in the arm; and
   a camera platform leveling system on the arm extension.

5. The camera dolly of claim 4 wherein the second attitude control system comprises spaced apart disks connected by a pair of leveling rods.

6. The camera dolly of claim 4 wherein the camera platform leveling system comprises a head pivotally mounted on a frame, and an eccentric pin bolt linked to the head.

7. The camera dolly of claim 4 wherein the second attitude control system comprises:
   a lower disk;
   an upper disk; and
   leveling rods joining the lower disk and the upper disk.

8. A camera dolly comprising:
   a dolly chassis;
   an arm on the chassis, the arm having a lower arm section, and an upper arm section pivotably attached to the lower arm section;

an actuator for lifting the lower arm section;

a motion transmission in the lower arm section linked to the upper arm section;

a first attitude control system in the arm;

an arm extension attached to the upper arm section;

a second attitude control system in the arm extension linked to the first attitude control system in the arm, the second attitude control system comprising a lower disk mechanically linked to an upper disk and a bolt tube attached to and aligned with a through hole in the upper disk; and a camera platform leveling system on the arm extension.

9. The camera dolly of claim 8 further comprising a plate supporting at least the upper disk, the plate having an upper end with three spaced apart holes alignable with the through hole in the upper disk, for vertical camera riser, inclined camera riser, and camera drop down functions.

10. The camera dolly of claim 8 further comprising a cross bolt extending centrally through the upper disk, and a camera platform leveling system pivotable about the cross bolt.

11. A camera dolly comprising:

a dolly chassis;

an arm on the chassis, the arm having a lower arm section, and an upper arm section pivotably attached to the lower arm section;

an actuator for lifting the lower arm section;

a motion transmission in the lower arm section linked to the upper arm section;

a first attitude control system in the arm;

an arm extension attached to the upper arm section;

a second attitude control system in the arm extension linked to the first attitude control system in the arm; and a platform leveling system comprising:
   a support plate;
   a side plate;
   a frame pivotably mounted between the support plate and the side plate;
   an upper disk linked to the frame;
   a head pivotably mounted on the frame; and
   a cross bolt extending through the plates, the frame and upper disk, and through a support plate bearing ring having a thickness greater than the support plate, and through a side plate bearing ring having a thickness greater than the side plate.

12. The camera dolly of claim 11 further comprising a head lateral leveling system.

13. A camera dolly comprising:

a dolly chassis;

an arm on the chassis, the arm having a lower arm section, and an upper arm section pivotably attached to the lower arm section;

an actuator for lifting the lower arm section;

a motion transmission in the lower arm section linked to the upper arm section;

a first attitude control system in the arm;

an arm extension attached to the upper arm section;

a second attitude control system in the arm extension linked to the first attitude control system in the arm; and a camera pedestal leveling system comprising:
   a support plate;
   a side plate;
   a frame pivotably mounted between the support plate and the side plate;
   an upper disk linked to the frame;
   a head pivotably mounted on the frame; and
   a lockout bolt positioned within lockout holes passing through the side plate and frame.

14. A camera dolly comprising:

a dolly chassis;

an arm on the chassis, the arm having a lower arm section, and an upper arm section pivotably attached to the lower arm section;

an actuator attached to the chassis and to the lower arm section;

a motion transmission in the lower arm section and linked to the upper arm section;

a first attitude control system in the arm;

an arm extension attached to the upper arm section;

a camera mounting plate supported on the arm extension;

a second attitude control system in the arm extension linked to the camera mounting plate and to the first attitude control system in the arm; and means for shifting the arm extension between a riser position and an arm extension position.

15. The camera dolly of claim 14 further comprising a leveling system supporting the camera mounting plate.

16. The camera dolly of claim 14 wherein the means for shifting includes a bolt tube on the arm extension; and a lock-out bolt extendable through the bolt tube and into the arm extension to lock the arm extension into a riser position with respect to the arm, and the lock-out bolt extendable through a lock-out hole in the arm extension, to lock the arm extension into an extension position with respect to the arm.

* * * * *